US009386566B2

(12) United States Patent  
Turtinen et al.

(10) Patent No.: US 9,386,566 B2  
(45) Date of Patent: Jul. 5, 2016

(54) METHOD, APPARATUS AND COMPUTER PROGRAM FOR CONTROLLING A USER EQUIPMENT

(71) Applicant: Broadcom Corporation, Irvine, CA (US)

(72) Inventors: Samuli Turtinen, Ii (FI); Sami-Jukka Hakola, Kempele (FI); Timo Kalevi Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 65 days.

(21) Appl. No.: 14/282,105

(22) Filed: May 20, 2014

(65) Prior Publication Data

US 2014/0348079 A1  Nov. 27, 2014

(30) Foreign Application Priority Data

May 21, 2013 (GB) .................................. 1309144.2

(51) Int. Cl.  
*H04W 72/04* (2009.01)  
*H04W 92/18* (2009.01)  
*H04W 76/02* (2009.01)

(52) U.S. Cl.  
CPC ........ *H04W 72/0406* (2013.01); *H04W 72/042* (2013.01); *H04W 72/0413* (2013.01); *H04W 76/023* (2013.01); *H04W 92/18* (2013.01)

(58) Field of Classification Search  
CPC ............ H04W 76/00; H04W 72/0406; H04W 72/0413; H04W 92/18; H04W 72/042; H04W 76/023  
See application file for complete search history.

(56) References Cited

U.S. PATENT DOCUMENTS

| 7,751,444 B2 * | 7/2010 | Chun ............... H04W 8/26 370/474 |
| 2006/0168343 A1 * | 7/2006 | Ma ................ H04W 52/383 709/245 |
| 2009/0257449 A1 * | 10/2009 | Chen ............... H04L 1/0041 370/470 |
| 2010/0157922 A1 * | 6/2010 | Kim ................ H04L 5/0094 370/329 |
| 2011/0103247 A1 * | 5/2011 | Chen ............... H04B 7/0452 370/252 |

(Continued)

FOREIGN PATENT DOCUMENTS

WO    2013165834    11/2013

OTHER PUBLICATIONS

R1-131925 3GPP TSG RAN WG1 Meeting #73; Fukoka, Japan May 20-24, 2013; "Discussion on Design Options for D2D Communication" (5 pages).

(Continued)

*Primary Examiner* — Mohammad Anwar  
(74) *Attorney, Agent, or Firm* — Oblon, McClelland, Maier & Neustadt, L.L.P.

(57) ABSTRACT

A user equipment (UE) has established a first radio link with a serving network node and a second device-to-device (D2D) radio link directly with another user equipment (UE). In response to having D2D data to send to the other UE over the D2D radio link, the UE sends to the serving network node on the first link a request for radio resources for a layer 1 (L1) control channel; and in response to an assignment of D2D resources by the serving network node in reply to that request, the UE sends on the assigned D2D resources to the other UE the D2D data and the L1 control channel. In one example the request includes an indication of the UE's link adaptation for the L1 control channel such as format for a PDCCH or ePDCCH and/or aggregation level.

20 Claims, 5 Drawing Sheets

(56) References Cited

U.S. PATENT DOCUMENTS

| | | | | |
|---|---|---|---|---|
| 2011/0243106 | A1* | 10/2011 | Hsu | H04L 5/0096 370/336 |
| 2011/0268046 | A1* | 11/2011 | Choi | H04L 5/0007 370/329 |
| 2012/0106517 | A1* | 5/2012 | Charbit | H04W 72/04 370/336 |
| 2012/0302272 | A1* | 11/2012 | Hakola | H04W 72/10 455/509 |
| 2013/0322388 | A1* | 12/2013 | Ahn | H04W 76/023 370/329 |
| 2014/0029560 | A1* | 1/2014 | Kim | H04L 5/001 370/329 |
| 2014/0086188 | A1* | 3/2014 | Hoymann | H04L 5/0053 370/329 |
| 2015/0146687 | A1* | 5/2015 | Kim | H04W 76/023 370/331 |

OTHER PUBLICATIONS

R1-131865 3GPP TSG RAN WG1 Meeting #73, Fukuoka, Japan May 20-24, 2013; "Physical Layer Options for D2D Communication" (6 pages).

S2-124826 3GPP TSG SA WG2 Meeting #94; New Orleans, USA, Nov. 12-16, 2012; "WID for Proximity Services Specification" (7 pages).

RP-121698 3GPP TSG RAN Meeting #58; Qualcomm Incorporated; "Study on LTE Device to Device Proximity Services" (6 pages).

"Direct Communication in 3GPP" by Hakseong, Kim of LG; (29 pages).

3GPP TS 36.211 version 11.2.0 release 11; Evolved Universal Terrestrial Radio Access (E-UTRA) "Physical Channels and Modulation" (111pages).

GPP TS 36.213 version 11.2.0 release 11; Evolved Universal Terrestrial Radio Access (E-UTRA) "Physical Layer Procedures" (175 pages).

* cited by examiner

| EPDCCH format | Number of ECCEs for one EPDCCH, $N_{EPDCCH}^{ECCE}$ | | | |
| --- | --- | --- | --- | --- |
| | Case A | | Case B | |
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | - | 32 | - | 16 |

Figure 1: prior art

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

METHOD, APPARATUS AND COMPUTER PROGRAM FOR CONTROLLING A USER EQUIPMENT

TECHNICAL FIELD

The present invention relates to a method, apparatus and computer program for controlling a user equipment. The exemplary and non-limiting versions of this disclosure relate generally to wireless communication systems, methods, devices and computer programs. Specific examples relate to procedures and related signalling for a user equipment (UE) to provide information to a radio network about radio resources requested for device-to-device (D2D) communications.

BACKGROUND

One of the building blocks in the evolution of the Third Generation Partnership Project (3GPP) evolved UMTS Terrestrial Radio Access (E-UTRA, sometimes referred to as Long Term Evolution LTE or LTE-Advanced)) system in Release 12 and onward is proximity services (ProSe) which relates to the physical position of the user equipment (UE). ProSe encompasses discovery of one UE by another within its proximity, and this discovery can be based on direct radio signals between these two UEs or on network-side proximity detection at the network side. ProSe also encompasses optimizing the communication path for UEs that are in proximity to one another, which can be realized by the direct communication between UEs or by a local switch within the E-UTRA network (E-UTRAN). A work item has been approved in the 3GPP for this purpose; see document S2-124826 entitled "WID for Proximity Services Specification" (3GPP TSG SA WG2 Meeting 394; New Orleans, US; 12-16 Nov. 2012); and document RP-121698 by Qualcomm, Inc. entitled "Study on LTE Device to Device Proximity Services" (3GPP TSG RAN Meeting #58).

For D2D communications operation, it is envisioned the control of D2D link is shared between the ProSe-enabled UE and the network (namely, the eNodeB or eNB in the case of E-UTRAN) when the ProSe-enabled UEs are served by an E-UTRAN. Document "Direct Communication in 3GPP" by Hakseong KIM of LG (undated, metadata indicates it was created on Oct. 15, 2012) details that the eNB schedules the radio resources for the D2D communication link but the UEs handle the link adaptation by themselves, in order to reduce the control signalling overhead such as frequent channel state reports to E-UTRAN that might otherwise be needed of the network did the link adaptation.

Figure 1:
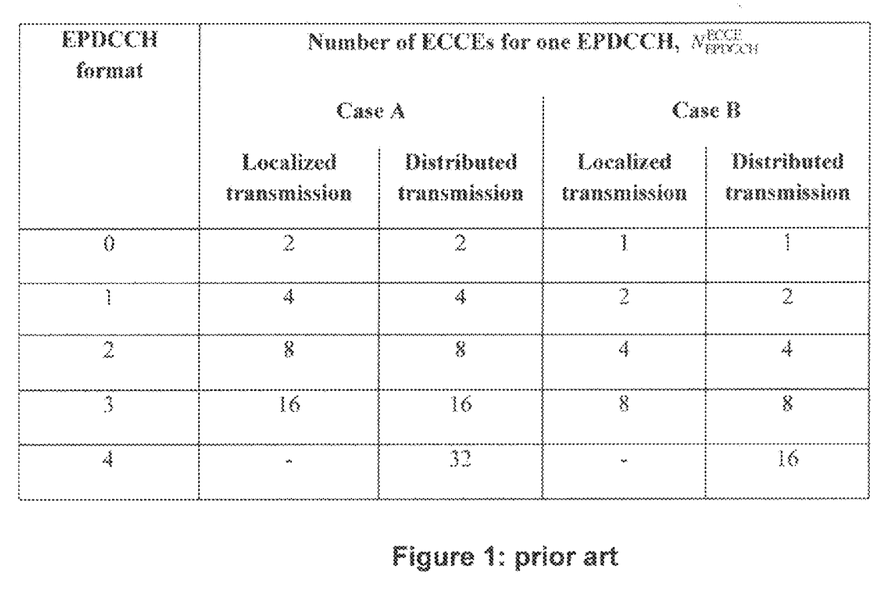
FIG. 1 shows a prior art table showing the formats supported by the ePDCCH and is reproduced from table 6.8A.1-2 of 3GPP TS 36.211 V11.2.0 "Physical channels and modulation"
Figure 2:
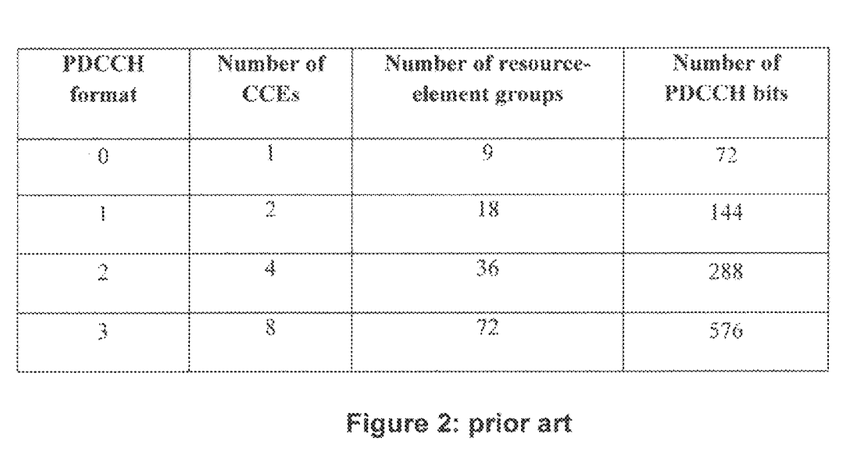
FIG. 2 shows a prior art table showing the formats supported by the PDCCH and is reproduced from table 6.8.1-1 of 3GPP TS 36.213 V11.2.0 "Physical layer procedures"

The eNB schedules radio resources via the Physical Downlink Control Channel (PDCCH), or via the ePDCCH. FIG. 1 is reproduced from table 6.8A.1-2 of 3GPP TS 36.211 V11.2.0 "Physical channels and modulation" and shows the formats supported by the ePDCCH. FIG. 2 is reproduced from table 6.8.1-1 of 3GPP TS 36.213 V11.2.0 "Physical layer procedures" and shows the formats supported by the PDCCH.

DETAILED DESCRIPTION

According to a first aspect of the present invention, there is provided a method for controlling a user equipment (UE), the method comprising: establishing a first radio link with a serving network node and a second device-to-device (D2D) radio link directly with another user equipment (UE); in response to having D2D data to send to the other UE over the D2D radio link, sending to the serving network node on the first link a request for radio resources for a layer 1 (L1) control channel; and in response to an assignment of D2D resources by the serving network node in reply to the request, sending on the assigned D2D resources to the other UE the D2D data and the L1 control channel.

According to a second aspect of the present invention, there is provided apparatus for controlling a user equipment (UE), the apparatus comprising a processing system configured to cause the apparatus to: establish a first radio link with a serving network node and a second device-to-device (D2D) radio link directly with another user equipment (UE); in response to having D2D data to send to the other UE over the D2D radio link, send to the serving network node on the first link a request for radio resources for a layer 1 (L1) control channel; and in response to an assignment of D2D resources by the serving network node in reply to the request, send on the assigned D2D resources to the other UE the D2D data and the L1 control channel.

According to a third aspect of the present invention, there is provided a computer program comprising a set of computer-readable instructions that are executable by a data processing system, the set of computer instructions comprising: code for establishing a first radio link with a serving network node and a second device-to-device (D2D) radio link directly with another user equipment (UE);code for sending to the serving network node on the first link a request for radio resources for a layer 1 (L1) control channel, in response to having D2D data to send to the other UE over the D2D radio link; and code for sending on assigned D2D resources to the other UE the D2D data and the L1 control channel, in response to assignment of the D2D resources by the serving network node in reply to the request.

The processing system described above may comprise at least one processor, and at least one memory including computer program code.

There may be provided a computer-readable memory tangibly storing a set of computer instructions as described above.

Some examples of embodiments of the present invention provide a way to ensure the network allocates sufficient radio resources for D2D communications, without over-allocating which is wasteful of scarce radio spectrum, when such communications also encompass the UEs performing their own link adaptation and related control signalling for the D2D data being exchanged.

Further features and advantages of the invention will become apparent from the following description of preferred embodiments of the invention, given by way of example only, which is made with reference to the accompanying drawings.

The examples detailed herein are in the context of a ProSe UE operating in a radio network utilizing the E-UTRAN radio access technology for the D2D communications, but this is only one example in order to provide a practical context for describing the inventive concepts detailed herein. These teachings may be utilized with other types of radio access technologies, such as for example UTRA including High Speed Downlink Packet Access (HSDPA), Wideband Code Division Multiple Access (WCDMA), Global System for Mobile Communications (GSM), and the like. Further, the UEs practicing the broader embodiments of these teachings may be in D2D communication but not necessarily using ProSe services, other than the network's allocation of resources for those D2D communications. The specific names of messages, channels, and various network entities in the examples below follow the nomenclature for E-UTRA networks, and these names also are not limiting to the broader teachings presented below but are for clarity of explanation.

In the D2D deployment in which the network allocates the D2D resources, control signalling may be reduced by having the UEs handle the link adaptation on the D2D links as noted above. More specifically, the ProSe UE can be considered to "schedule" (meaning choose the modulation and coding scheme MCS, transport block size, etc.) its transmissions via layer 1 (L1) control signalling on the radio resources that are assigned for the D2D link by the eNB. As a non-limiting example, such L1 control signalling could be based on the existing evolved Physical Downlink Control Channel (ePDCCH). As is already done in the eNB to UE link, it is desirable that the link adaptation for the L1 control channel be supported (such as by control channel element (CCE) aggregation) in the D2D link by the UEs to ensure reliable transmission of the L1 control before the actual data is sent.

Because the L1 control channel is deployed on the same resources as the corresponding D2D data resources, it would be desirable for the eNB to know the amount of control resources that are required when making the overall scheduling decisions about the D2D radio resources, since in essence the amount of resources for one transmission should preferably not be less than the amount of control resources required for one transmission. Current procedures in the conventional LTE system support the UE's resource request by means of buffer status reporting (BSR), but the BSR simply informs the network of how much data the UE has to send and does not give the network information about how much L1 control channel resources are needed.

Figure 3:
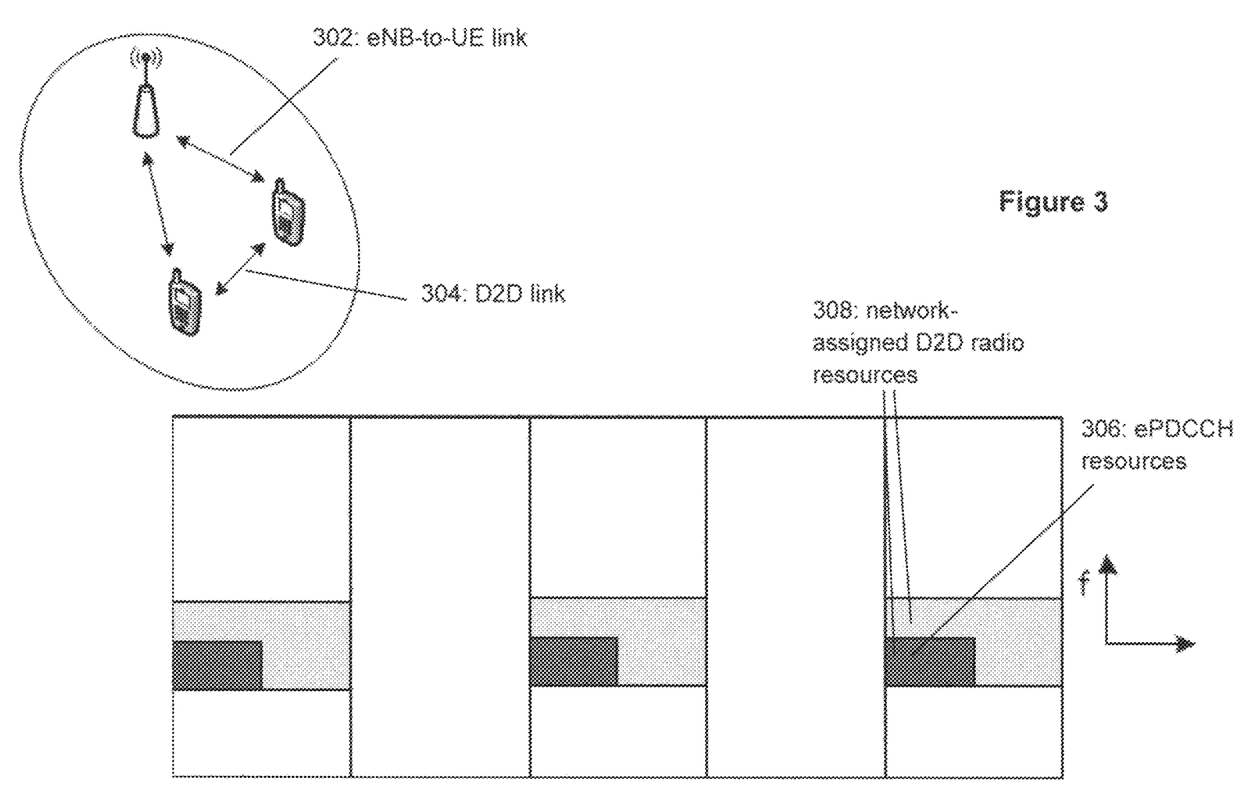
FIG. 3 shows a schematic diagram depicting an example of various links in a radio environment where the network assigns resources for D2D communications, and a block graph showing how the ePDCCH radio resources may be multiplexed into D2D radio resources that are assigned by the network, and is an exemplary radio environment in which embodiments of these teachings may be practiced to advantage.

D2D links 304 and eNB-UE links 302 are shown at the inset of FIG. 3. The block graph at FIG. 3 illustrates how ePDCCH resources 306, which are shown via darker shading, could be multiplexed within D2D resources 308 that are assigned by eNB, where all the shaded areas of the graph represent those assigned radio resources. In essence, the network does not know from the BSR how large that darker shaded ePDCCH resource 306 will be since the UEs are the ones using it for their own link adaptation of the D2D link 304. Without knowing how big is the ePDCCH resources, the network must guess at how much total resources 308 to allocate for D2D for this UE pair.

Figure 4:
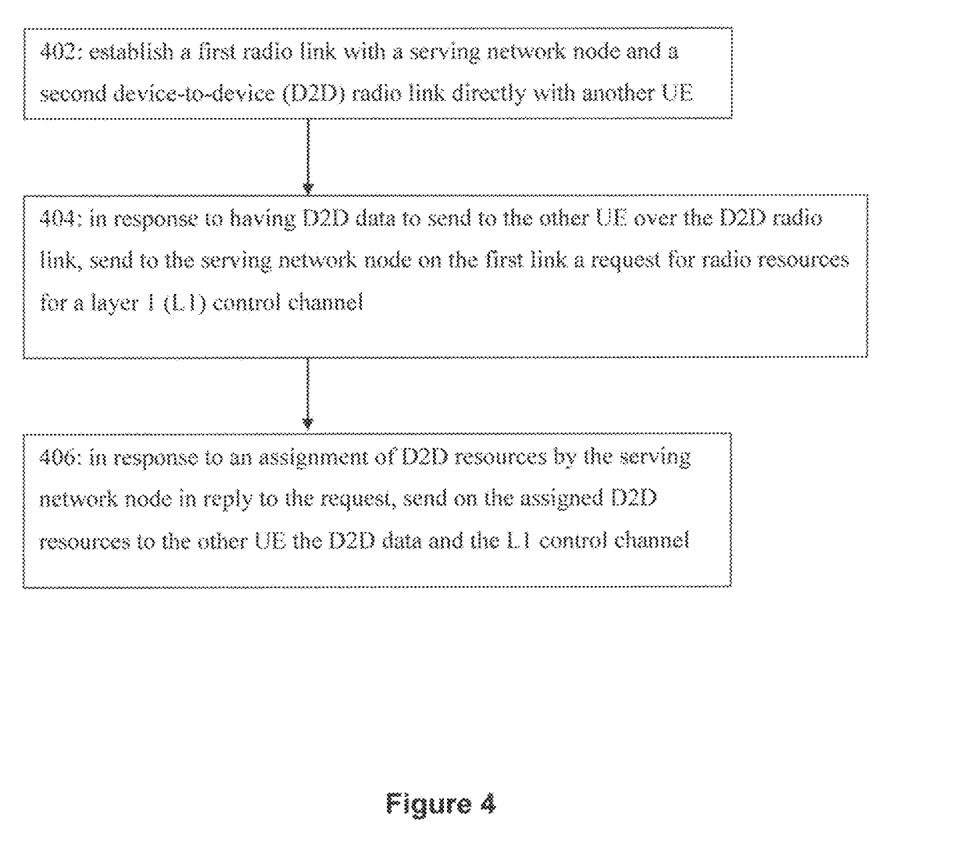
FIG. 4 shows an example of a logic flow diagram that illustrates the operation of a method, a result of execution of by apparatus, and execution of computer instructions comprising code embodied on a computer-readable memory, in accordance with the example versions of this disclosure.

Embodiments of these teachings have the ProSe UE, which is in direct (D2D) communication with another ProSe UE, indicate the required, or otherwise requests from the serving network node (the eNB in E-UTRAN), radio resources for L1 control signalling for the D2D communication path 304. An overview of the process from the perspective of the UE requesting the D2D resources is shown at FIG. 4, and further details and alternatives are described hereafter. As shown at FIG. 4 the UE is controlled such that at block 402 it establishes a first radio link with a serving network node and a second device-to-device (D2D) radio link directly with another user equipment (UE). Various methods are known in the art for establishing these links 302, 304 and so the basic establishment will not be detailed further; the control channel used by the D2D UE for the D2D link adaptation is to more efficiently use the D2D link once it is established. The cellular link 302 may be established for example via a handover from a neighbour cell or from a random access (RACH) procedure as is well known in the art.

At block 404, in response to having D2D data to send to the other UE over the D2D radio link, the UE sends to the serving network node on the first link a request for radio resources for a layer 1 (L1) control channel. As will be detailed below, there may be other conditions besides having data to send; the network may instruct the UE via radio resource control (RRC) signalling that such requests for L1 control channel resources are to be periodic, or are to be only on an as-needed basis. And at block 406, in response to an assignment of D2D resources by the serving network node in reply to the request of block 404, the UE sends on the assigned D2D resources to the other UE the D2D data and the L1 control channel.

In one embodiment, the ProSe UE in direct (D2D) communication with another ProSe UE requests resources for L1 control signalling from the serving network node (namely, the eNB in this E-UTRAN example). In an embodiment, the request is done along with the corresponding D2D link data resource request that is along with the buffer status report (BSR) of the logical channels associated with the corresponding D2D link.

In an embodiment, the request of block 404 is done via medium access control (MAC) signalling. So for example the request may comprises a buffer status report for the D2D data to be sent on the D2D radio link to the other UE, and also an indication of link adaptation for the L1 control channel.

In one implementation, this indication of link adaptation indicates an aggregation level to be used on the L1 control channel. So for example the resource request for L1 control signalling is done by indicating the required aggregation level for the L1 control, which in the table below is given with 2 bits:

00—Aggregation level 1
01—Aggregation level 2
10—Aggregation level 4
11—Aggregation level 8

Assuming that the L1 control channel for which the D2D UE is requesting resources is a Physical downlink Control Channel (PDCCH) or an evolved PDCCH (ePDCCH), then in another implementation (alone or combined with the aggregation level embodiment) the indication of link adaptation can indicate a format for the PDCCH or ePDCCH. As an example of how this required ePDCCH/PDCCH format can be indicated in the resource request to the eNB for L1 control signalling, if it is assumed that ePDCCH format 4 is not supported for D2D, then the format indication can be two bits also as in the non-limiting example below:

00—(e)PDCCH format 0
  01—(e)PDCCH format 1
  10—(e)PDCCH format 2
  11—(e)PDCCH format 3

In another embodiment for indicating the PDCCH or ePDCCH format, the request for the radio resources for the PDCCH or ePDCCH having format 0 may be implicit in an explicit indication of discontinuous transmission (DTX) as in either of the following examples:

3-bit signalling
  000—(e)PDCCH format 0
  001—(e)PDCCH format 1
  010—(e)PDCCH format 2
  011—(e)PDCCH format 3
  100—(e)PDCCH format 4
  110—reserved
  111—reserved
  2-bit signalling
  DTX—(e)PDCCH format 0
  00—(e)PDCCH format 1
  01—(e)PDCCH format 2
  10—(e)PDCCH format 3
  11—(e)PDCCH format 4

In the 2-bit signalling example immediately above, DTX means that control channel resources are not explicitly requested and the eNB may assume (e)PDCCH format 0 to be used for the D2D UE's L1 control channel signalling.

In an alternative embodiment, the UE's request at block 404 for the radio resources for the L1 control channel indicates a payload size (in bits it requires) for transmission of the L1 control channel.

Figure 5A:
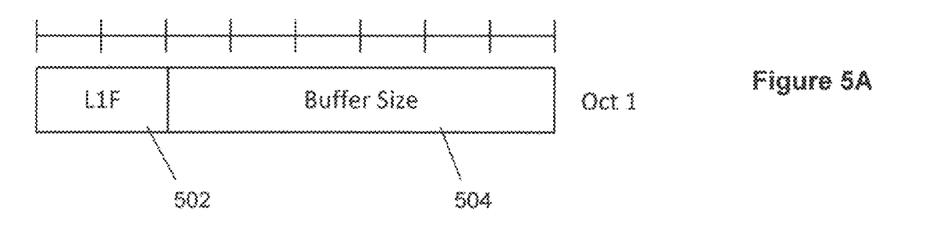
FIGS. 5A-C illustrate various embodiments of an example of a medium access control (MAC) control element adapted according to these teachings to indicate a request for L1 control channel resources.

In another embodiment, the UE's request at block 404 for the radio resources for the L1 control channel is in a logical channel group identification (LCG ID) field of a MAC control element which also comprises the buffer status report. This is shown for example at FIG. 5A which is adapted from the short (truncated) BSR MAC control element shown at FIG. 6.1.3.1-1 of 3GPP TS 36.321 V11.2.0 "Medium Access Control (MAC)". If it is assumed that in this D2D deployment a logical channel group for a given D2D link does not need to be assigned, and/or the eNB knows the BSR corresponds to a given D2D link by some other means (such as by mapping the scheduling request (SR) resources from the physical layer to the given D2D link), then the LCG ID field in the conventional BSR MAC control element can be re-purposed as shown at FIG. 5A to a L1 field 502 which is used to indicate the UE's request at block 404 for the radio resources for the L1 control channel. The buffer size field 504 can be used for the BSR as is conventional.

Figure 5B:
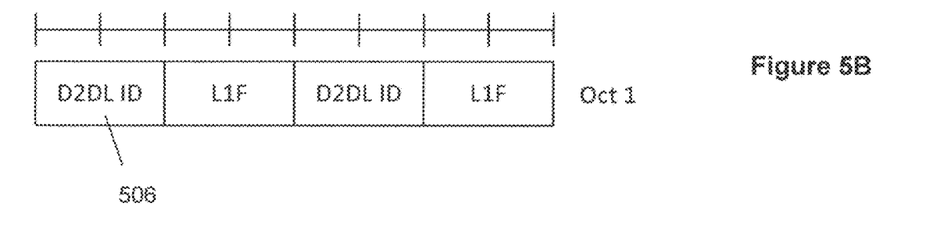
Figure 5C:
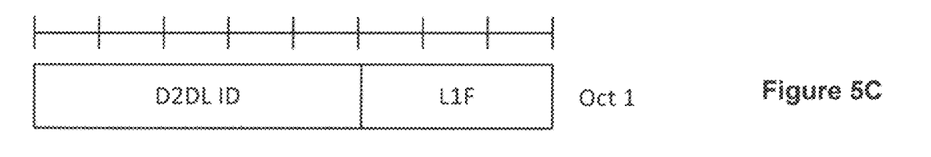

In another embodiment, for example if the LCD ID field is required for its conventional purposes, a new MAC control element is defined for requesting L1 control resources for D2D links; and FIGS. 5B and 5C illustrate a few example formats of these embodiments. At FIGS. 5B and 5C, the field 506 D2DL ID stands for D2D link identification and the field L1F can indicate the L1 control format/aggregation level.

Figure 6:
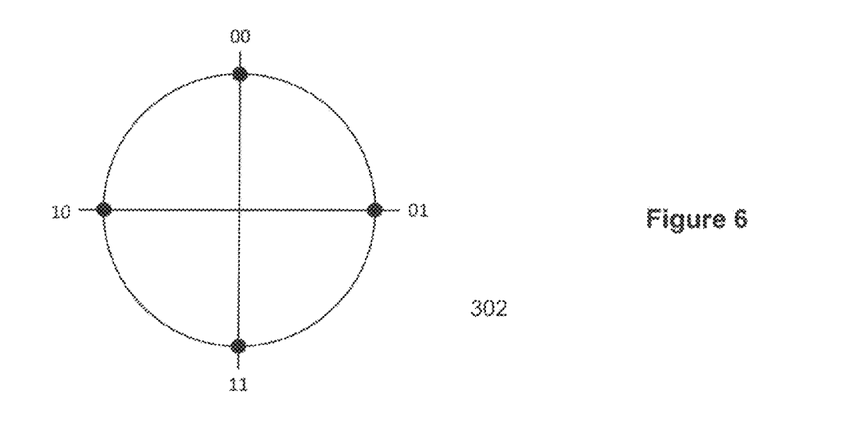
FIG. 6 shows an example of a QPSK map in which each QPSK symbol maps to an individual PDCCH or ePDCCH format, or to an L1 control channel aggregation level, which the UE is requesting by sending that QPSK symbol, according to an exemplary embodiment of these teachings.

In a still further embodiment, the UE's request at block 404 of FIG. 4 comprises L1 signalling sent on the first radio link with the serving network node/eNB. In one implementation of this, the L1 signalling (the UE's request for the L1 control channel resources) sent on the first radio link comprises a scheduling request for resources on the corresponding D2D radio link, and this scheduling request is QPSK multiplexed such that one QPSK symbol corresponds to one L1 control channel format. An example of this is shown at FIG. 6 for the ePDCCH; the scheduling request signal for D2D is QPSK (Quaternary Phase Shift Keying) multiplexed, and one QPSK symbol corresponds to the required/requested L1 control format. The UE's transmittal of the signal indicates its scheduling request need. In another embodiment, one QPSK symbol corresponds to one L1 control channel aggregation level so the QPSK symbol chosen by the UE indicates to the eNB the aggregation level that the UE will use on the D2D link 304 for which resources are being requested. Some example L1 control channel aggregation levels are listed above.

As was briefly noted above, the UE's request for radio resources for the layer 1 (L1) control channel may in an embodiment be sent according to Radio Resource Control (RRC) signalling that the UE received from the serving network node that indicates whether such requests are to be sent periodically or on an as-needed basis. This RRC signalling configures the UE's L1 control resource request to be done periodically and/or on a need basis so that in the latter case the UE indicates the required L1 control format/aggregation level and such to the network only when the currently used configuration is changed. The periodic option could be configured when the D2D link quality varies frequently; the as-needed option could be the case generally, which would reduce the required signalling overhead on the UE to eNB link 302 significantly as compared to the case where UEs report their D2D channel quality information to the eNB and the eNB makes the scheduling decision for data as well as the usable L1 control format.

Consider further the case where the RRC signalling indicates that the UE's L1 control resource request is done on a need basis. In one example, this RRC signalling can direct the UE to send its request only when the format of the L1 control channel is changed due to a deterioration in the second D2D radio link, which may be manifest in the UE informing the eNB of the need for a higher aggregation level (or other format change for the L1 control channel that indicates the D2D channel quality has become poorer). In another embodiment, this RRC signalling can direct the UE to send its L1 control resource request only when the format of the L1 control channel is changed to some predetermined format, which the eNB can use as a proxy from which it can imply channel quality on the D2D link.

Referring again to block 404 of FIG. 4, the UE can send its request for radio resources for the L1 control channel in response to receiving from the eNB some downlink signalling querying the UE's need for a control channel on the second D2D link. In this example embodiment, this would be in addition to having D2D data to send as block 404 recites. This downlink signalling may for example be MAC signalling or L1 signalling. Particularly for the non-limiting example where this downlink signalling about the UE's need for a D2D control channel is L1 signalling, the eNB can send this downlink signalling with a previous assignment of D2D resources from a previous iteration of resource request by the UE and assignment by the eNB. So for example in a previous iteration of FIG. 4 the UE gets in block 406 the assignment and the downlink signalling telling it to send L1 control channel requests only as needed. Assuming the control channel format has changed to satisfy the need criteria when the UE re-executes FIG. 4 the next time it needs a D2D L1 control channel, then the UE sends its request for that control channel at block 404.

This embodiment, when combined with the RRC signalling above that indicates whether the UE's L1 control resource request should be periodic or on a need basis, enables a dynamic reporting option so that for example the network can rapidly update its information about the D2D link if the previously-configured periodic reporting is no longer sufficient to adapt to changing control channel formats that the UE needs/requests on the D2D channel.

The above teachings provide several technical effects, namely:

Link adaptation for the D2D link can be done by the UEs themselves (both control and data channel link adaptation).

The eNB may calculate the required amount of resources per subframe more accurately as the amount of L1 control stands for one transmission while buffer status report for the data indicates just how much data the UE needs to transmit.

The Signalling overhead can be greatly reduced as compared to reporting channel state/quality information to eNB.

By means of the required control format/aggregation level indicated by the D2D UE, the eNB may assess the feasibility of the D2D link as compared to moving the traffic path to be routed via the network, for example when the required amount of control in relation to data to be transmitted is too high.

The whole process of FIG. 4 can be performed by the UE itself, or by one or more components thereof. In the above non-limiting examples this UE is a ProSe D2D UE operating in an E-UTRAN radio network environment but this is a non-limiting example. The logic diagram of FIG. 4 may be considered to illustrate the operation of a method, and a result of execution of a computer program stored in a computer-readable memory, and a specific manner in which components of an electronic device are configured to cause that electronic device to operate, whether such an electronic device is the UE, or one or more components thereof such as a modem, chipset, or the like. The various blocks shown in FIG. 4 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the example embodiments of this disclosure may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the example embodiments of this disclosure.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a UE, to perform the various functions summarized at FIG. 4 and (c) circuits, such as a microprocessor(s) or a portion of a microprocessor(s), that require software or firmware for operation, even if the software or firmware is not physically present. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or an application specific integrated circuit (ASIC) for a user equipment UE or a similar integrated circuit in a server or network device/radio network access node which operates according to these teachings.

Figure 7:
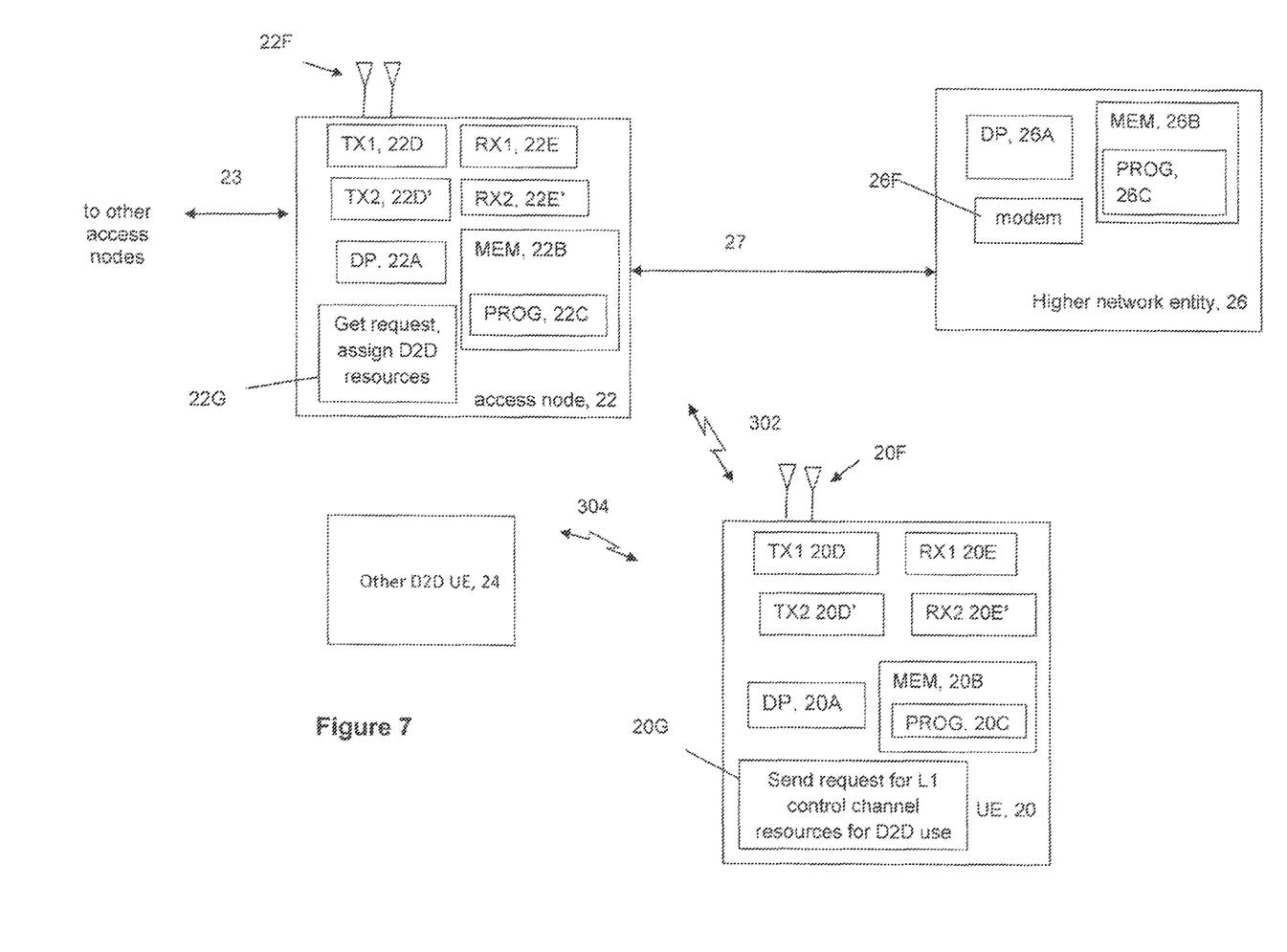
FIG. 7 shows a simplified block diagram of an example of a UE in communication with an access node such as a NodeB, and illustrates exemplary electronic devices suitable for use in practicing the example embodiments of this disclosure.

Reference is now made to FIG. 7 for illustrating a simplified block diagram of various electronic devices and apparatus that are suitable for use in practicing the example embodiments of this disclosure. In FIG. 7 a radio access network access node 22 is adapted for communication over a first wireless link 302 with an apparatus, such as a mobile terminal or UE 20. The access node 22 may be any access node such as a NodeB or an eNodeB (including frequency-selective repeaters and remote radio heads) of any wireless network, such as E-UTRAN/LTE/LTE-Advanced, UTRAN, HSDPA, WCDMA, GSM, GERAN, and the like. The operator network of which the access node 22 is a part may also include a network control element or other higher network entity 26 such as a radio network controller RNC in the case of a UTRAN and WCDMA/HSDPA network, or a mobility management entity MME for the case of LTE/LTE-Advanced networks in which case the MME may also serve as the serving gateway S-GW. This higher network entity 26 generally provides connectivity with the core cellular network and with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, and communication means such as a transmitter TX1 20D and a receiver RX1 20E for bidirectional wireless communications with the access node 22 using the operative radio access technology, and also with another UE 24 over a second (D2D) radio link 304 via that same radio access technology or a different technology. For completeness a second RF chain is shown for the UE 20 as a second TX2 20D' and a second RX2 20E' in case the UE 20 is using two different technologies on the two different links 302, 304, but UEs having only a single RF chain can readily implement the embodiments of these teachings which are detailed above. All of the relevant wireless communications are facilitated via one or more antennas 20F. Also stored in the MEM 20B at reference number 20G are the computer code or algorithms for the UE to operate according to exemplary embodiments above by requesting resources for L1 control channel(s) for use on the D2D link 304 and for using the allocated L1 resources for link adaptation using a PDCCH or ePDCCH as in the examples above.

The other UE 24 is functionally similar to the first UE 20 and need not be detailed further.

The access node 22 also includes processing means such as at least one data processor (DP) 22A, storing means such as at least one computer-readable memory (MEM) 22B storing at least one computer program (PROG) 22C, and communication means such as a first transmitter TX1 22D and a first receiver RX1 22E for bidirectional wireless communications with the UE 20 on the first link 302, and possibly also a second transmitter TX2 22D' and a second receiver RX2 22E' for wireless communications with other UEs under its control. Regardless, all these wireless communications are via one or more antennas 22F, which for a NodeB are typically implemented as an antenna array. The access node 22 stores at block 22G in certain embodiments its own computer software code or algorithms to cause the access node to recognize the L1 control channel request from the UE and include resources sufficient for it in the network's allocation of D2D resources for the UE 20 as detailed above.

Also at FIG. 7 is shown a higher network entity 26 above the radio access node 22. In UTRAN (for example, HSDPA and WCDMA) this higher network entity 26 may be a radio network controller RNC, whereas in LTE/LTE-Advanced this entity 26 may be a MME and/or a S-GW as noted above. However implemented, the higher network entity 26 includes processing means such as at least one data processor (DP) 26A, storing means such as at least one computer-readable memory (MEM) 26B storing at least one computer program (PROG) 26C, and communication means such as a modem 26F for bidirectional communications with the access node 22 and with other access nodes under its control or coordination over the data and control link 27.

While not particularly illustrated for the UEs 20, 24 or for the access node 22, those devices are also assumed to include as part of their wireless communicating means a modem and/or a chipset and/or an antenna chip which may or may not be inbuilt onto a radiofrequency (RF) front end module within those devices 20, 22, 24 and which also operates according to the teachings set forth above.

At least one of the PROGs 20C in the UE 20 is assumed to include a set of program instructions that, when executed by the associated DP 20A, enable the device to operate in accordance with the example embodiments of this disclosure, as detailed above. The access node 22 and the higher network entity 26 also has software stored in their respective MEM 22B/26B to implement certain versions of this disclosure, as detailed above. In these regards, the example embodiments of this disclosure may be implemented at least in part by computer software stored on the MEM 20B, 22B, 26B which is executable by the DP 20A of the UE 20 and/or by the DP 22A of the access node 22 and/or by the DP 26A of the higher network entity 26, or by hardware, or by a combination of tangibly stored software and hardware (and tangibly stored firmware) in any one or more of these devices 20, 22, 26. In this manner the respective DP with the MEM and stored PROG may be considered a data processing system. Electronic devices implementing these example embodiments of this disclosure need not be the entire devices as depicted at FIG. 7 or may be one or more components of same such as the above described tangibly stored software, hardware, firmware and DP, a system-on-a-chip SOC, an application specific integrated circuit ASIC, a digital signal processor DSP, a modem, an antenna module, or a RF front end module as noted above.

In general, the various embodiments of the UE 20 can include, but are not limited to personal portable digital assistance devices having wireless communication capabilities, including but not limited to cellular and other mobile phones (including smart phones), navigation devices, laptop/palmtop/tablet computers, digital cameras and music devices, Internet appliances, USB dongles and data cards, machine-to-machine communication devices, and the like.

Various embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing example embodiments of this disclosure may become apparent to those skilled in the relevant arts in view of the foregoing description. While the exemplary embodiments have been described above in the context of the UTRAN systems, as noted above the example embodiments of this disclosure are not limited for use with only these particular types of wireless radio access technology networks.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for controlling a user equipment, the method comprising;
   establishing a first radio link with a serving network node and a second device-to-device (D2D) radio link directly with another user equipment (UE);
   in response to having D2D data to send to the other UE over the D2D radio link, sending to the serving network node on the first link a request for radio resources for a layer 1 (L1) control channel for the user equipment to use to perform scheduling of L1 control signaling; and
   in response to an assignment of D2D resources by the serving network node in reply to the request, sending on the same assigned D2D resources, to the other UE, the D2D data and the L1 control channel signaling.

2. The method according to claim 1, wherein the request is sent via medium access control (MAC) signaling.

3. The method according to claim 2, wherein the request comprises a buffer status report for the D2D data to be sent on the D2D radio link to the other UE and an indication of link adaptation for the L1 control channel.

4. The method according to claim 3, wherein the indication of link adaptation indicates an aggregation level to be used on the L1 control channel.

5. The method according to claim 3, wherein the L1 control channel is a Physical downlink Control Channel (PDCCH) or an evolved PDCCH (ePDCCH) and the indication of link adaptation indicates a format for the PDCCH or ePDCCH.

6. The method according to claim 5, wherein the request for the radio resources for the PDCCH or ePDCCH having format 0 is implicit in an explicit indication of discontinuous transmission (DTX).

7. The method according to claim 1, wherein the request for the radio resources for the L1 control channel indicates a payload bit size for the L1 control channel.

8. The method according to claim 3, wherein the request for the radio resources for the L1 control channel is in a logical channel group identification field of a MAC control element which also comprises the buffer status report.

9. The method according to claim 1, wherein the request comprises L1 signaling sent on the first radio link to the serving network node.

10. The method according to claim 9, wherein the L1 signaling sent on the first radio link comprises a scheduling request for resources on the D2D radio link.

11. The method according to claim 10, wherein the scheduling request is QPSK multiplexed such that one QPSK symbol corresponds to one L1 control channel format or to one L1 control channel aggregation level.

12. The method according to claim 1, wherein the request for radio resources for the layer 1 (L1) control channel is sent according to Radio Resource Control (RRC) signaling received from the serving network node that indicates whether such requests are to be sent periodically or on an as-needed basis when a format of the L1 control channel is changed.

13. The method according to claim 12, wherein the RRC signaling indicates that such requests are to be sent when the format of the L1 control channel is changed due to a deterioration in the second D2D radio link.

14. The method according to claim 12, wherein the RRC signaling indicates that such requests are to be sent when the format of the L1 control channel is changed to a predetermined format.

15. The method according to claim 1, wherein the request for radio resources for the L1 control channel is sent in response to receiving from the serving network node downlink signaling querying the UE's need for a control channel on the second D2D link.

16. The method according to claim 15, wherein the downlink signaling received from the serving network node is L1 signaling which comprises a previous assignment of D2D resources by the serving network node.

17. An apparatus for controlling a user equipment, the apparatus comprising:
  circuitry configured to
    establish a first radio link with a serving network node and a second device-to-device (D2D) radio link directly with another user equipment (UE);
    in response to having D2D data to send to the other UE over the D2D radio link, send to the serving network node on the first link a request for radio resources for a layer 1 (L1) control channel for the user equipment to use to perform scheduling of L1 control signaling; and
    in response to an assignment of D2D resources by the serving network node in reply to the request, send on the same assigned D2D resources, to the other UE, the D2D data and the L1 control channel signaling.

18. The apparatus according to claim 17, wherein the request is sent via at least one of medium access control (MAC) signaling and Radio Resource Control (RRC) signaling,
  wherein the request sent via MAC signaling comprises a buffer status report for the D2D data to be sent on the D2D radio link to the other UE and an indication of link adaptation for the L1 control channel, and/or
  wherein the RRC signaling received from the serving network node indicates whether such requests are to be sent periodically or on an as-needed basis when a format of the L1 control channel is changed.

19. The apparatus according to claim 17, wherein the request for radio resources for the L1 control channel is sent in response to receiving from the serving network node downlink signaling querying the UE's need for a control channel on the second D2D link.

20. A non-transitory computer-readable memory comprising a set of computer-readable instructions that are executable by a data processing system, which comprises at least one processor and at least one memory including computer program code, the set of computer instructions comprising:
  code for establishing a first radio link with a serving network node and a second device-to-device (D2D) radio link directly with another user equipment (UE);
  code for sending to the serving network node on the first link a request for radio resources for a layer 1 (L1) control channel for the user equipment to use to perform scheduling of L1 control signaling, in response to having D2D data to send to the other UE over the D2D radio link; and
  code for sending on the same assigned D2D resources, to the other UE, the D2D data and the L1 control channel signaling, in response to assignment of the D2D resources by the serving network node in reply to the request.

* * * * *